United States Patent [19]

Ogino

[11] Patent Number: 4,653,259

[45] Date of Patent: Mar. 31, 1987

[54] REINFORCEMENT FOR RUBBER AND METHOD OF MAKING SAME

[75] Inventor: Takao Ogino, Tokorozawa, Japan

[73] Assignee: Bridgestone Corporation, Japan

[21] Appl. No.: 765,480

[22] Filed: Aug. 14, 1985

[30] Foreign Application Priority Data

Aug. 14, 1984 [JP] Japan .................................. 59-168743

[51] Int. Cl.⁴ ..................... A01D 34/08; A01D 34/13; A01D 34/46; B23P 19/04
[52] U.S. Cl. ........................................ 57/243; 29/505; 29/456; 29/527.5; 57/212; 57/218; 57/902; 152/548; 164/462; 164/476
[58] Field of Search ..................... 29/527.5, 505, 456; 164/76.1, 476, 462, 477; 140/149; 57/902, 212, 214, 218, 243; 152/548; 428/171

[56] References Cited

U.S. PATENT DOCUMENTS

| 2,598,033 | 5/1952 | Baurdon ................................ 57/212 |
| 3,395,528 | 8/1968 | Lucht .................................... 57/212 |
| 4,176,513 | 12/1979 | Young et al. ..................... 57/218 X |
| 4,178,985 | 12/1979 | Sauvage .......................... 164/462 X |
| 4,268,573 | 5/1981 | Baillievier ......................... 57/214 X |
| 4,495,691 | 1/1985 | Masumoto et al. ............. 164/476 X |

FOREIGN PATENT DOCUMENTS 76618 4/1983 European Pat. Off. ............ 164/462

Primary Examiner—Charlie T. Moon
Attorney, Agent, or Firm—Sughrue, Mion, Zinn, Macpeak, and Seas

[57] ABSTRACT

A reinforcement for rubber is disclosed, which comprises a cord made from an amorphous iron-base alloy filament previously subjected to a wire drawing at a reduction of area of not less than 10%.

8 Claims, 6 Drawing Figures 1 x 4 Structure 1 x 4 Structure 7 x 4 Structure

REINFORCEMENT FOR RUBBER AND METHOD OF MAKING SAME

BACKGROUND OF THE INVENTION

Field of the Invention and Related Art Statement

This invention relates to a rubber reinforcement using an amorphous iron-base alloy filament as a cord stock.

More particularly, the invention proposes developmental results that the service durability of tires is largely improved by using the above reinforcement in a belt layer, a carcass ply or a chafer layer of radial tires or a breaker layer of bias tires, and that the cord weight used can be reduced by the properties inherent to the amorphous alloy such as high strength, low specific gravity and the like to thereby design the weight-saving of the tire under the same casing strength.

Tires are required to have high level performances on the running service life, high speed running property, safety and the like. For this purpose, pneumatic tires using steel cords are widely used.

Since steel cord exhibits a low reduction of the breaking tenacity due to heat history as compared with organic fiber cords, high service durability is maintained even when the tire is continuously run at a high speed for a long time, so that such a steel cord is primarily used in tires for passenger cars and long-distance transportation trucks.

In such a steel cord, however, there are some drawbacks such as reduction of strength due to the occurrence of rust, reduction of strength due to the reduction of filament section resulted from a phenomenon of rubbing filaments with each other during the running (or fretting phenomenon), corrosion fatigue breakage resulting from water or the like in rubber, and so on.

In this connection, amorphous alloys have been studied because they have excellent properties such as high strength, corrosion resistance, abrasion resistance and so on. Particularly, it is expected to rapidly enhance the durable life if amorphous iron-base alloy filaments containing small amounts of Cr, Mo, Ni and the like, which are able to develop a high corrosion resistance, can be used as a tire cord material instead of the steel cord. At present, the practicability of such as amorphous alloy is mainly progressed in the field of electric and magnetic materials, and the technology for manufacturing the same is fairly advanced, but the form of the resulting alloy is mainly a very thin ribbon.

Considering the application of the amorphous alloy to the tire, the twisting of the ribbon as a tire cord material is difficult and the stress concentration is conspicuous in the ribbon edge portion, so that the ribbon of the amorphous alloy cannot be effectively used in the tire. This is a reason why the application of the amorphous alloy to the tire is backward in spite that this alloy is generally excellent in the strength and corrosion resistance.

Lately, there has been established a production technology where an amorphous iron-base alloy filament having a circular section is relatively stably obtained as a continuous filament by jet-spinning molten metal into a refrigerant carrier as disclosed in Japanese Patent laid open No. 57-52,550, No. 57-134,248 and No. 57-161,128. As a result the applicability of such a filament to tires is largely developed, and various fundamental examinations are made as disclosed in Japanese Patent laid open No. 57-160,702. Moreover, the filaments obtained by jet-spinning into the refrigerant carrier as described above certainly have high strength, high Young's modulus, high fatigue properties and high corrosion resistance, but tend to be fairly poor in the toughness as compared with the existing piano wire (steel).

That is, this filament is inferior in strength after the bending deformation, strength at kinking and the twisting property to piano wire, which is considered due to the fact that there is existent no plastic elongation in stress-strain curve (or so-called S—C curve) during the elongation deformation, and practically causes various problems in the application to tires.

Further, the filament as spun is poor in sectional roundness, and particularly the diameter thereof changes in the longitudinal direction to cause the unevenness of diameter, at where stress may be locally concentrated to lead the breakage.

When these filaments are twisted to form a cord, it is generally required to ensure form stability and flaring resistance to the cord by subjecting the filament to a preliminary working at a form ratio corresponding to the twisting pitch of the cord. For this purpose, the preliminary working for the formation of wavy form is carried out by passing the filament through rod portions of several millimeters in diameter under flexing several times to give a fairly large strain to the filament.

However, the filaments as spun by jetting into refrigerant carrier frequently cause breakage during twisting because of no plastic deformation region and poor toughness. Further, even if the cord is successfully formed by twisting of the filaments, there is a risk of causing the filament breakage during subsequent tire running due to a large local slide deformation portion produced by poor toughness and size unevenness, particularly non-uniform deformation in twisting. These facts become a serious obstacle in the application of the filament to tires.

In order to apply the cord obtained by twisting the amorphous iron-base alloy filaments to tires, therefore, it is required to improve fundamental properties of the filament as well as the twisting property thereof and avoid the occurrence of the breakage during tire running. For this purpose, it is a subject matter to attain high levels of toughness, roundness and dimensional stability of the filament.

SUMMARY OF THE INVENTION

It is, therefore, an object of the invention to improve the twisting property of amorphous iron-base alloy filaments by subjecting the filament to a wire drawing to satisfy the simultaneous improvement of strength, elongation and toughness.

It is another object of the invention to enhance the durable life of a tire by using the above filaments as a cord stock for tire reinforcement while sufficiently making the best use of the properties of the amorphous alloy and to achieve the weight-saving of the tire by reducing the weight of the cord used.

The inventor has made studies with respect to subjecting the filament as spun to wire drawing for the insurance of roundness, and found that the amorphous iron-base alloy filament as spun can relatively easily be drawn though it has no plastic elongation, whereby not only the reduction of unevenness in the roundness is achieved but also the strength at break and elongation at break of the drawn filament are increased to not less than 15% and not less than 50%, respectively, as compared with those of the spun filament and particularly the increment of the elongation is substantially obtained as a plastic elongation.

Further, it has been found that when such a drawn filament is used as a cord stock, no breakage is caused in preliminary working for the twisting and also that even when the resulting twisted cord is used in the tire, no breakage during the running is observed under the severe test conditions, which show the considerably improving effect as compared with the case of using the spun filament as a cord stock.

As a result of analysis on the drawn filament by means of a differential scanning colorimeter, it has been confirmed that the amount of structural relaxation representing the noncrystallinity becomes very large as compared with the spun filament before the wire drawing, i.e. the noncrystallinity is shifted to a higher state by the wire drawing to enhance the toughness.

Also, it is considered that the wire drawing acts to uniformly disperse the slight slide deformation portion, whereby multiple sliding is caused the tensile deformation to produce the improvement of elongation.

Namely, it has been clarified that the wire drawing of the amorphous iron-base alloy filament induces the change of amorphous structure and the presence of a multiple slide face and is suitable as a treatment for simultaneously satisfying the improvement of strength, elongation and toughness required as a cord stock for tire.

According to the invention, thus, there is the provision of a reinforcement for rubber comprising a cord obtained by subjecting an amorphous iron-base alloy filament, which is produced by jet spinning molten metal into a refrigerant carrier, to a wire drawing at a reduction of area of not less than 10% and then twisting a plurality of resulting drawn filaments as a cord stock.

DETAILED DESCRIPTION OF THE INVENTION

According to the invention, the restriction of the amorphous alloy to iron-base amorphous alloy is based on the following reason.

As the amorphous alloy for the formation of continuous and spinnable filaments, there may be mentioned palladium-base alloy, iron-base alloy, cobalt-base alloy and the like. Among them, only the iron-base and cobalt-base alloy filaments have strength and elongation at break equal to or larger than those of the existing piano wire in view of the application to tires. Considering the fatigue properties, corrosion resistance (improvement based on the addition of a small amount of a corrosion-resistant element), economic reasons and the like, only the iron-base alloy is used as the amorphous alloy.

Figure 1:
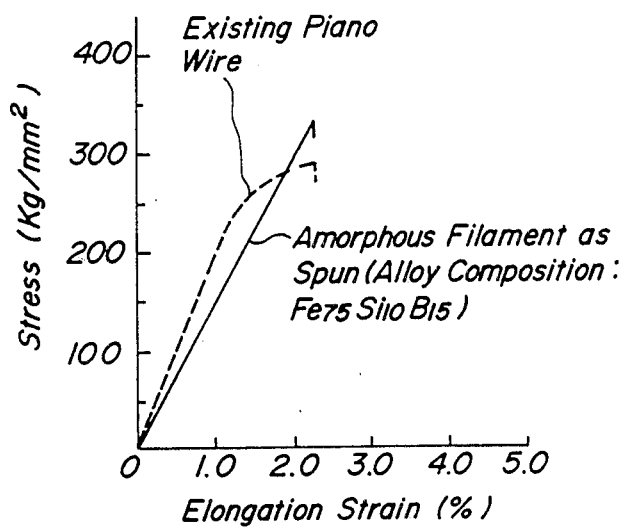
FIG. 1 is a graph showing S—S curve in the existing piano wire and the amorphous alloy filament.

In FIG. 1 is shown an S—S curve of an amorphous filament as spun having an alloy composition of $Fe_{75}$-$Si_{10}B_{15}$ by a solid line together with that of the existing piano wire (shown by a broken line).

Figure 2:
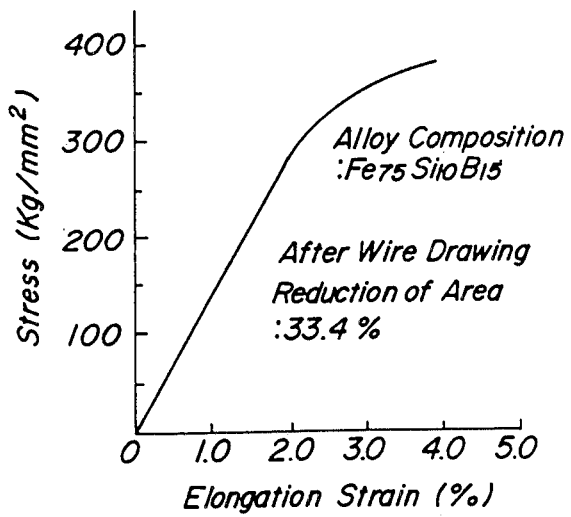
FIG. 2 is a graph showing S—S curve of the cord stock according to the invention.

When the above amorphous filament is subjected to a wire drawing at a reduction of area of 33.4%, the properties of the filament are improved as shown in the S—S curve of FIG. 2 in comparison with FIG. 1.

The reason why the reduction of area on the spun filament is limited to not less than 10% is due to the fact that when the reduction of area is less than 10%, the plastic elongation required for the twisting property is not obtained and the improvement of strength and elongation at break is small, and the roundness of the filament and the uniformization of longitudinal size may be insufficient.

Figure 3:
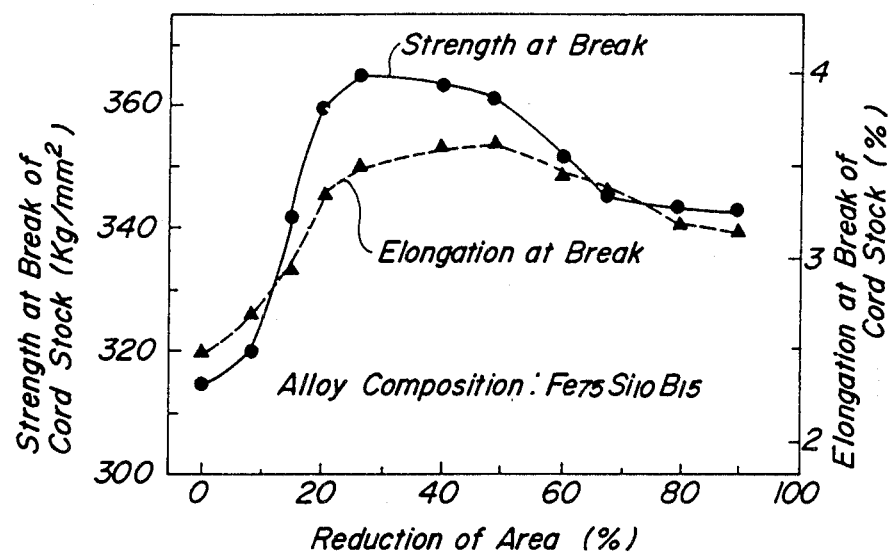
FIG. 3 is a graph showing an influence of the reduction of area on the strength and elongation at break of the cord stock.

The reduction of area is preferable within a range of 15–60%. When it exceeds 60%, the twisting property is sufficiently achieved, but the strength and elongation at break are not improved as shown in FIG. 3. Further, in order to provide a high reduction of area, it is necessary to repeat the wire drawing by using plural dies, so that the wire drawing at the reduction of area of more than 60% is not too valuable.

The following examples are given in the illustration of the invention and are not intended as limitations thereof.

EXAMPLE

An amorphous metallic filament was manufactured at a length of about 500 m per lot by melting an alloy base material with a composition of $Fe_{72}Cr_8P_{13}C_7$ in a quartz tube having a spinning nozzle at its tip at about 1,200° C. and jetting it together with an argon gas into water cooled at about 5° C. through the spinning nozzle.

In this case, the five kinds of filaments were manufactured by using the spinning nozzle with a hole diameter of (i) 0.12 mm, (ii) 0.125 mm, (iii) 0.13 mm, (iv) 0.14 mm and (v) 0.155 mm, respectively. Among them, each of the filaments (ii) to (v) was subjected to a wire drawing up to a diameter of 0.12 mm. Thereafter, the filament (i) as spun and the drawn filaments (ii) to (v) were used as a cord stock, respectively, each of which was twisted into a cord as a tire reinforcement.

In this case, the cord with a twisting structure of $7 \times 4 \times 0.12$ mm$\phi$ was produced by a tubular system at a twisting speed of 10 m/min and applied as a reinforcement to the tire. Moreover, the strand of $1 \times 4$ structure constituting such a cord in the above five samples was checked with respect to the breakage rate after the preliminary working at a given form ratio to obtain results as shown in the following Table 1.

Figure 4A:
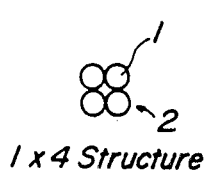
FIGS. 4a and 4b are schematically sectional views of the twisting structure of the cord stock, respectively.
Figure 4B:
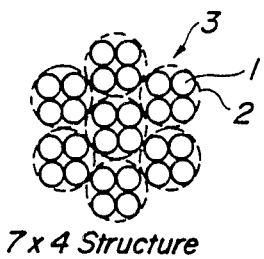

The breakage rate was expressed by the breaking number produced when twisting plural filaments of 500 m in length. The $1 \times 4$ structure and $7 \times 4$ structure are shown in FIGS. 4a and 4b, respectively, wherein numeral 1 is a cord stock, numeral 2 a strand and numeral 3 a cord.

TABLE 1

| No. | Pass through drawing dies | Reduction of area (%) | Strength at break (kg/mm$^2$) | Elongation at break (%) | Breakage rate (times) |
|---|---|---|---|---|---|
| (i) | — | 0 | 315 | 2.5 | 21 |
| (ii) | 0.125→0.12 | 7.8 | 320 | 2.7 | 18 |
| (iii) | 0.13→0.125→0.12 | 14.8 | 342 | 2.9 | 0 |
| (iv) | 0.14→0.132→0.125→0.12 | 26.5 | 365 | 3.5 | 0 |
| (v) | 0.155→0.147→0.14→0.132→ | 40.1 | 363 | 3.7 | 0 |

TABLE 1-continued

| No. | Pass through drawing dies | Reduction of area (%) | Strength at break (kg/mm²) | Elongation at break (%) | Breakage rate (times) |
|---|---|---|---|---|---|
| | 0.125→0.12 | | | | |

As seen from Table 1, when the reduction of area is less than 10%, the strength of the cord stock is low level and the breakage rate is large in the twisting, while when the reduction of rate is not less than 10%, the breakage rate is not observed and the elongation at break of the filament is very high level.

Then, the cord of 7×4 structure obtained by using the strand of 1×4 structure was applied to the tire, provided that portion causing no breakage was used in the cord stock Nos. (i) and (ii). In this case, the tire size, application method and test conditions were as follows:

Tire size: 750R 16

Figure 5:
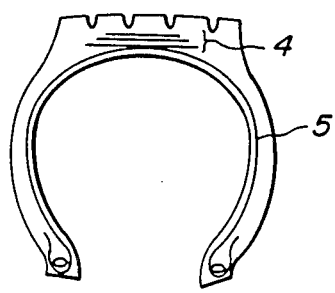
FIG. 5 is a schematically sectional view of a test tire.

Application method:

In the tire having three belt layers 4 as shown in FIG. 5, the above five cords were applied to an outermost belt layer so that each cord was used in each of five divided portions of the tire circumference in the same tire.

The tread count in the belt layer was 24 cords per width of 25 mm.

Test conditions:

The tire subject to an internal pressure of 6.0 kg/cm² was run on a drum at a speed of 60 km/hr under a 100% load.

After the running over a distance of 40,000 km, a cord sample was taken out from the belt of the tire and measured with respect to the breaking tenacity and retention of breaking tenacity in the cord after the running to obtain results as shown in the following Table 2.

TABLE 2

| No. | Breaking tenacity of filament (kg) | Initial breaking tenacity of cord (kg) | Breaking tenacity of cord after running (kg) | Retention of breaking tenacity (%) |
|---|---|---|---|---|
| (i) | 3.56 | 94.7 | 73.9 | 78 |
| (ii) | 3.62 | 96.3 | 80.9 | 84 |
| (iii) | 3.87 | 102.9 | 99.8 | 97 |
| (iv) | 4.13 | 109.8 | 107.6 | 98 |
| (v) | 4.11 | 109.3 | 107.1 | 98 |

Note
Each of Nos. (i) to (v) corresponds to the respective cord stock of Table 1.
Each data is an average of ten measured values.

As seen from Table 2, when the cord is made from the cord stock being not subjected to a wire drawing or the cord stock drawn at a reduction of area of less than 10%, the retention of breaking tenacity is fairly low, and the breakage of filament is frequently caused in the running of the tire. For instance, it has been confirmed that about 6 filaments among 28 filaments constituting the cord of 7×4 structure in cord No. (i) are broken during the running because the retention of breaking tenacity is 78%.

On the other hand, when the cord stock is subjected to the wire drawing at the reduction of area is not less than 10%, the reduction of breaking tenacity hardly occurs, and the breakage of the cord stock can substantially completely be suppressed even during the running.

Next, the superiority of the cord made from the amorphous metallic filament was confirmed from a viewpoint of corrosion fatigue resistance. As the amorphous metallic filament was used the cord stock No. (iv), which is considered to be subjected to an optimum wire drawing, together with the existing piano wire as a comparative example.

The tire size, application method and test conditions were as follows:

Tire size: 750R 16

Application method:

The cord of 7×4 structure was made from the cord stock of each of the amorphous alloy filament and the existing piano wire of 0.12 mm in diameter, and then applied as a ply member to a carcass 5 of FIG. 5 at a thread count of 25 cords per width of 25 mm.

Test conditions:

The tire subjected to an internal pressure of 6.0 kg/cm² was run on a drum at a speed of 60 km/hr under a JIS 100% load.

In this case, a service life until the occurrence of breakage due to the corrosion of cord was measured by sealing about 300 cc of water between the tube and the inner liner in the tire to obtain results as shown in the following Table 3.

TABLE 3

| Sample | Service life during the running on drum (km) |
|---|---|
| existing piano wire | 14,200 |
| | 16,400 |
| amorphous alloy filament | no failure after running over 50,000 km |
| | no failure after running over 50,000 km |

(Measuring number: 2)

As apparent from Table 3, the cord breakage based on the corrosion fatigue is caused at a running distance of about 15,000 km in the tire using the existing piano wire, while in the tire using the amorphous metallic filament, no failure is caused even over a running distance of 50,000 km and also no breakage of filaments constituting the cord is observed. That is, the corrosion resistance is proved to be considerably enhanced by using the amorphous alloy filament.

According to the invention, the amorphous alloy filaments first make possible to be put into practical use as a cord stock for tire reinforcement.

What is claimed is:

1. A reinforcement for rubber comprising a cord obtained by subjecting an amorphous iron-base alloy filament, which is produced by jet spinning molten metal into a refrigerant carrier, to a wire drawing at a reduction of area of not less than 10% and then twisting a plurality of resulting drawn filaments as a cord stock.

2. The reinforcement for rubber according to claim 1, wherein said reduction of area is within a range of 15 to 60%.

3. A method of manufacturing a reinforcement for an elastomeric cord comprising the steps of:
   producing an amorphous iron-base alloy filament by jet spinning molten metal into a refrigerant,
   drawing said filament into a wire at a reduction of area of at least 10% and,
   twisting a plurality of drawn wires into a cord stock.

4. The method of claim 3 wherein said reduction in area is in the range of 15 to 60%.

5. The method of claim 4 wherein said amorphous iron-base alloy is $Fe_{75}Si_{10}B_{15}$.

6. The method of claim 4 wherein said amorphous iron-base alloy is $Fe_{72}Cr_8P_{13}C_7$.

7. The method of claim 4 wherein said step of twisting comprises twisting said wire into a 7×4 structure.

8. The method of claim 4 wherein said step of twisting comprises twisting said wires into a 1×4 structure.

* * * * *